(12) United States Patent
Konnerth et al.

(10) Patent No.: US 10,686,924 B2
(45) Date of Patent: *Jun. 16, 2020

(54) METHOD FOR MANAGING A CALL JOURNAL, DEVICE, COMPUTER PROGRAM, AND SOFTWARE PRODUCT FOR THIS PURPOSE

(71) Applicant: Unify GmbH & Co. KG, Munich (DE)

(72) Inventors: Bernd Konnerth, Munich (DE); Thomas Lederer, Herrsching (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,306

(22) Filed: Apr. 10, 2019

(65) Prior Publication Data
US 2019/0238671 A1    Aug. 1, 2019

Related U.S. Application Data

(63) Continuation of application No. 15/954,787, filed on Apr. 17, 2018, now Pat. No. 10,306,041, which is a
(Continued)

(30) Foreign Application Priority Data

Jul. 11, 2014    (DE) .......................... 10 2014 010 305

(51) Int. Cl.
*H04M 1/2746* (2020.01)
*H04M 1/725* (2006.01)
(Continued)

(52) U.S. Cl.
CPC ..... *H04M 1/2746* (2020.01); *H04M 1/72569* (2013.01); *H04M 3/42059* (2013.01);
(Continued)

(58) Field of Classification Search
CPC ....... H04M 1/274583; H04M 3/42059; H04M 3/42102; H04M 3/42365; H04M 2203/2072; H04M 2250/60; H04W 4/02
See application file for complete search history.

(56) References Cited

U.S. PATENT DOCUMENTS 7,519,589 B2 * 4/2009 Charnock .............. G06Q 30/02
8,296,173 B2 * 10/2012 Raffel ............ G06Q 10/063118
705/7.29
(Continued)

FOREIGN PATENT DOCUMENTS

CN          1768520 A      5/2006
DE     102005023963 A1     11/2006
(Continued)

OTHER PUBLICATIONS

Written Opinion of the International Searching Authority for PCT/EP2015/001335 dated Aug. 21, 2015 (Form PCT/ISA/237).
(Continued)

*Primary Examiner* — Mehmood B. Khan
(74) *Attorney, Agent, or Firm* — Buchanan Ingersoll & Rooney PC

(57) ABSTRACT

Managing a call log of a communication device can include generation of a display list with list entries that are derived from the log entries of the call log, and provision of the display list for a user of the communication device. The order of the list entries in the display list can be determined by an evaluation of at least one criterion (e.g. current device parameters, current connection parameters, upcoming or current calendar events, a previous frequency of contact with the communication partner to whom the log entry is assigned, previous acceptances/rejections when contacted by the communication partner to whom the log entry is
(Continued)

assigned, weather data, for example, temperature and/or precipitation at the time the display list was generated.

20 Claims, 5 Drawing Sheets

Related U.S. Application Data continuation of application No. 15/324,431, filed as application No. PCT/EP2015/001335 on Jul. 1, 2015, now Pat. No. 9,979,807.

(51) Int. Cl.
*H04M 3/42* (2006.01)
*H04W 4/02* (2018.01)

(52) U.S. Cl.
CPC ... *H04M 3/42102* (2013.01); *H04M 3/42365* (2013.01); *H04W 4/02* (2013.01); *H04M 2203/2072* (2013.01); *H04M 2250/60* (2013.01)

(56) References Cited

U.S. PATENT DOCUMENTS

| | | | | |
|---|---|---|---|---|
| 8,705,707 | B1* | 4/2014 | Schilit | H04M 1/72572 |
| | | | | 379/88.11 |
| 9,529,864 | B2* | 12/2016 | Sundelin | G06F 16/24575 |
| 2002/0151334 | A1 | 10/2002 | Sharma | |
| 2003/0126288 | A1* | 7/2003 | Tsurusaki | H04M 1/2749 |
| | | | | 709/239 |
| 2004/0030753 | A1* | 2/2004 | Horvitz | G05B 19/404 |
| | | | | 709/206 |
| 2004/0192270 | A1 | 9/2004 | Kreitzer | |
| 2007/0185899 | A1* | 8/2007 | Ziv | G06F 12/12 |
| 2007/0263843 | A1* | 11/2007 | Foxenland | H04M 1/56 |
| | | | | 379/355.02 |
| 2008/0253544 | A1* | 10/2008 | Brown | H04M 3/48 |
| | | | | 379/201.12 |
| 2008/0319932 | A1* | 12/2008 | Yih | G06K 9/6256 |
| | | | | 706/20 |
| 2009/0094340 | A1* | 4/2009 | Gillai | G06F 15/16 |
| | | | | 709/206 |
| 2011/0047246 | A1* | 2/2011 | Frissora | G06F 9/543 |
| | | | | 709/219 |
| 2013/0346408 | A1 | 12/2013 | Duarte et al. | |
| 2014/0185609 | A1 | 7/2014 | Efrati et al. | |
| 2016/0366077 | A1* | 12/2016 | Dong | H04L 51/36 |
| 2017/0006147 | A1* | 1/2017 | Plumb | H04M 1/56 |
| 2017/0075894 | A1* | 3/2017 | Poornachandran | |
| | | | | G06F 16/24578 |
| 2017/0236081 | A1* | 8/2017 | Grady Smith | G06Q 10/0637 |
| | | | | 705/7.36 |
| 2019/0220789 | A1* | 7/2019 | Reynolds | G06Q 10/06311 |

FOREIGN PATENT DOCUMENTS

| | | |
|---|---|---|
| EP | 1528770 A2 | 5/2005 |
| EP | 2503764 A1 | 9/2012 |
| WO | 2008030967 A2 | 3/2008 |
| WO | 2011098491 A1 | 8/2011 |
| WO | 2012100227 A2 | 7/2012 |

OTHER PUBLICATIONS

International Search Report for PCT/EP2015/001335 dated Aug. 21, 2015 (Form PCT/ISA/210).

* cited by examiner

METHOD FOR MANAGING A CALL JOURNAL, DEVICE, COMPUTER PROGRAM, AND SOFTWARE PRODUCT FOR THIS PURPOSE

CROSS-REFERENCE TO RELATED APPLICATIONS

This application is a continuation application of U.S. patent application Ser. No. 15/954,787, which is a continuation of U.S. patent application Ser. No. 15/324,431, which is the United States National Stage of PCT International Patent Application No. PCT/EP2015/001335, filed on Jul. 1, 2015, and claiming priority to German Patent App. No. 10 2014 010 305.6, filed on Jul. 11, 2014.

BACKGROUND OF THE INVENTION

Field of the Invention

Embodiments relate to methods for managing a call log. Embodiments may also relate to a device, a computer program and a software product.

Background of the Related Art

Owners of cell phones use their phones for communication (voice, video, text messages) with communication partners. Historical connection data, i.e., a function integrated in a cell phone, such as a call history, call record, connection list (all of these are understood to mean a call record for the purposes of this invention), is used to establish a communication connection. The user scrolls through his call log and selects the desired person. The call log may be long and it may be time-consuming to find the desired entry. At present, call logs are usually in chronological order. This means that calls are displayed in a list sorted by date and time. In addition, a differentiation is made between missed, answered and outgoing calls. A grouping (summary) of all calls from/to a certain remote terminal is also currently offered by some mobile devices.

According to WO2011098491, call lists are organized and displayed by the current geographic position of the mobile device in order to identify the entries more easily and efficiently. The current position is saved for each communication event.

The theory disclosed in EP1528770 gives the user the option of saving the relevant or a selected entry in a call list with individual information during a conversation, wherein saving occurs independently of the call list. Individual information includes memos, voice recordings and the like that are entered by the user. Information compiled in this way can be displayed later with a service menu. This menu allows the use of data added from a call list, for example, for automatically establishing a connection to forward information or read or edit a directory entry.

BRIEF SUMMARY OF THE INVENTION

According to one embodiment of the invention, a method for managing a call log of a preferably mobile communication device, which is designed in particular as a telephone or mobile device, is proposed, wherein the call log has log entries for outgoing and/or incoming calls, wherein each log entry contains communication metadata, including at least:
  connection identifier of the communication partner,
  date and time of the call,
  direction of the call,
  and preferably including:
  location information of the communication device at the time of the call,
  and wherein the method includes the following steps:
  a) generation of a display list with list entries that are derived from the log entries in the call log, and
  b) provision of the display list for a user of the communication device.

According to the invention, an order of the list entries in the display list is determined by an evaluation of at least one criterion selected from the group that includes
  current device parameters, for example, available communication media, such as instant message, telephone call, video call, and e-mail,
  current connection parameters, for example, connection quality such as bandwidth, signal strength, and quality of a GSM signal,
  upcoming or current calendar events,
  a previous frequency of contact with the communication partner to whom the log entry is assigned,
  previous acceptances/rejections when contacted by the communication partner to whom the log entry is assigned,
  weather data, for example, temperature and/or precipitation
  at the time when the display list was generated.

DETAILED DESCRIPTION OF THE INVENTION

Figure 1:
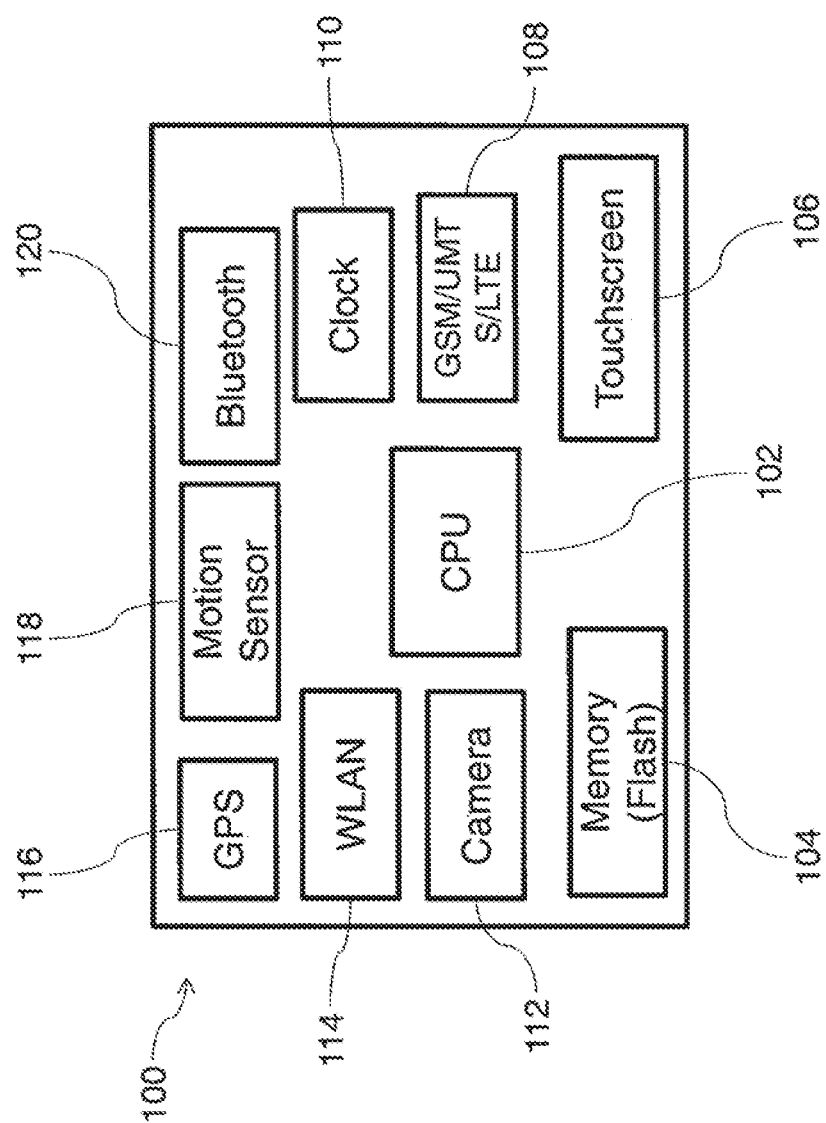
FIG. 1 a schematic diagram of a communication device according to the present invention.

As previously mentioned, according to one embodiment of the invention, a method for managing a call log of a preferably mobile communication device, which is designed in particular as a telephone or mobile device, is provided, wherein the call log has log entries for outgoing and/or incoming calls, wherein each log entry contains communication metadata, including at least:
  connection identifier of the communication partner,
  date and time of the call,
  direction of the call,
  and preferably including:
  location information of the communication device at the time of the call,
  and wherein the method includes the following steps:
  c) generation of a display list with list entries that are derived from the log entries in the call log, and
  d) provision of the display list for a user of the communication device.

According to the invention, an order of the list entries in the display list is determined by an evaluation of at least one criterion selected from the group that includes
  current device parameters, for example, available communication media, such as instant message, telephone call, video call, and e-mail, current connection parameters, for example, connection quality such as bandwidth, signal strength, and quality of a GSM signal, upcoming or current calendar events, a previous frequency of contact with the communication partner to whom the log entry is assigned, previous acceptances/rejections when contacted by the communication partner to whom the log entry is assigned, weather data, for example, temperature and/or precipitation at the time when the display list was generated.

For the purposes of the invention, a communication device is any device that is designed and configured for communicating, and may be, for example, a cell phone, another telephone, a fax machine, a mail server or an FTP server. In particular, a communication device can be a mobile or stationary device for voice communication and/or data transmission. For the purposes of the invention, a call is a communication process that is performed with the communication device. An outgoing call is understood to be one that is initiated from the communication device and an incoming call one that is directed to the communication device. In this sense, the direction of a call may be incoming or outgoing. For the purposes of the invention, a connection identifier is any code sequence or character sequence that is suitable for identifying a communication partner, such as a telephone number (including fax numbers, service numbers, etc.), e-mail address, FTP identifier, URL or the like. It should be understood that one connection identifier can correspond to one communication partner. However, multiple connection identifiers can also be assigned to one communication partner. For the purposes of the invention, calendar events are events scheduled in advance, such as discussions, training units, or recreational activities, entered in a calendar that is accessible from the device.

It is understood that criteria can be cumulative and, if applicable, can also be logically linked. Each rule for accumulating or linking criteria can be understood as a criterion in its own right. The invention allows intelligent sorting and/or filtering of call lists (call logs) through the use of additional information. With this invention, sorting of call lists (call logs) can be improved by including time-, location-, and situation-based filters and sorting functions. The proposed intelligent sorting is based, for example, on statistical calculations, in which parameters such as the current date, the time, calendar entries and the address (from information on surroundings derived from the current address) are entered. An additional parameter may be saved location information that is assigned to a particular communication event in the past. The calculation itself can occur in the device or centrally in a server. Through the method according to the invention, it is possible to simplify the use of a user's call logs.

A preferred embodiment of the present invention is based on the observation that the communication partner is frequently selected in correlation with situational information such as the location of the user or the current time. For example, normally when someone is at home, they do not call themselves, or a number frequently called on the way to work can be the number of a supervisor or team member, to inform him, for example, of the expected time of arrival at the workplace, or the phone number of a certain conference bridge is always dialed Wednesday mornings at 10:00 AM, and the like. Intelligent management of the call log with consideration of time and place can help make this process even more convenient.

On the basis of the aforementioned considerations, an additional criterion for establishing the order of the list entries in the display list can be selected from the group that includes:

a current time, in particular a time of day, which is preferably derived from the current time, a current date, in particular a current day of the week, which is preferably derived from the current date, and current location information at the time the display list was generated.

For the purposes of the invention, a time of day is a preset category of time, such as "morning", "afternoon", "evening", "night". The method can be designed in an even more flexible and user-friendly manner if times of day can be freely defined, for example as "core working hours" or "lunch break". The boundaries between categories can also be freely definable. With the additional criteria, meaningful logical connections between sorting criteria can be realized, such as "core working hours only Mon-Fri," "during core working hours," "accepted during lunch break," etc.

In another embodiment of the method according to the invention, the evaluation can include a probability calculation that determines, for each connection identifier, based on previous log entries in the call log, the probability that a call with that connection identifier, which meets at least one criterion, will go out from or come into the communication device. It should be understood that incoming calls also enter into the evaluation, since they too could give an indication of a possibly desired communication process if the selected criteria arise. Who made the call in the history may not be important under certain circumstances.

The clarity of the list can be increased if, according to a further embodiment of the method according to the invention, multiple log entries in the call log are combined into one list entry in the display list. A list entry preferably includes all of the log entries for one connection identifier and/or person, if applicable, combined on the same communication medium and/or the same communication type.

Likewise, display list clarity and sorting accuracy can be improved, according to an additional embodiment of the method according to the invention, if the display list is limited to a preset maximum number of list entries, and/or list entries with a preset minimum probability.

The flexibility and user awareness of the method can be increased if, according to additional embodiments of the method according to the invention, the determination of the order can be influenced by the user of the communication device, by at least one measure selected from the following:

selection, preference and/or exclusion of groups of connection identifiers, restriction to incoming or outgoing calls, establishment of a minimum probability, establishment of a maximum number of list entries.

In embodiments of the method according to the invention, the location information can be selected from the group that includes:

coordinates of a satellite navigation system,

WLAN access to one or more dial-in nodes, proximity or pairing status to one or more other Bluetooth devices, RFID information, environment categories, current weather data.

For the purposes of the invention, a satellite navigation system is a system in which location is determined by runtime sounding data from multiple satellites, e.g.

(NAVSTAR) GPS, Galileo, Compass, GLONASS, IRNSS, or the like, and also expansion systems such as WASS, EGNOS, MSAS, SDKM, etc. For the purposes of the invention, environment categories are types of environments in which the user of the communication device finds himself, which allow a conclusion to be drawn about a preferred communication behavior of the user and which can be derived, as a non-restrictive example, from coordinates and/or from the evaluation of access to certain dial-in nodes (access points) or Bluetooth devices and/or RFID information. Environment categories may include, for example, but are not limited to car, home, office, conference room, work, etc. For the purposes of the invention, weather data may include, for example, but are not limited to temperature and/or precipitation. Thus, contacts to certain recreational activities can be included in the prioritization.

One embodiment of the invention proposes a device for managing a call log of a preferably mobile communication device, which is designed in particular as a telephone or mobile device, wherein the device is designed and configured to perform the method described above. The device can preferably be the communication device itself or a central call management server.

Additional aspects of the invention concern a computer program for managing a call log of a preferably mobile communication device, which is designed in particular as a telephone or mobile device, including program commands, which trigger a computer to execute the steps of the described method, if the computer program is loaded into or run on the computer, and a software product for managing a call log of a preferably mobile communication device, which is designed in particular as a telephone or mobile device, which is saved on a medium that can be read by a computer and can preferably be loaded directly into the internal memory of a computer and has program codes for performing the steps of the method described above if the computer program is run on the computer. The invention can also be represented by a digital storage medium with electrically readable control signals that can work with a programmable computer in order to manage communication activities, wherein the control signals are designed and adapted to cause the computer to execute the process steps of the method described above.

The computer can also be represented by the communication device, a server such as a call management server, a personal computer or the like.

Additional features, tasks, advantages and details of the present invention will become more apparent from the following description of exemplary embodiments and their representation in drawings in the included figures. It is understood that features, tasks, advantages and details of individual exemplary embodiments are transferable to other exemplary embodiments and are considered to be disclosed also in connection with the other exemplary embodiments unless this is obviously inapplicable for technical or physical reasons. Accordingly, features of various exemplary embodiments can fundamentally be combined with other exemplary embodiments and the combination can also be considered an exemplary embodiment of the invention.

The invention is described below in more detail based on preferred exemplary embodiments and with reference to the figures.

The figures are schematic illustrations and not necessarily according to scale. The graphic representations and their descriptions are intended to illustrate the principle of the invention and shall in no way restrict the invention.

FIG. 1 shows a schematic diagram of a communication device 100 according to one embodiment of the present invention. The communication device 100 is designed and configured to execute the method described in more detail below. In the present embodiment, the communication device 100 is a mobile device, in particular a smart phone.

According to the diagram in FIG. 1, the communication device 100 has a central processing unit (CPU) 102. Furthermore, the communication device has a memory 104, a touchscreen 106, a mobile communication unit 108, a clock 110, a camera 112, a WLAN unit 114, a GPS unit 116, a motion sensor 118 and a Bluetooth unit 120, which are connected to the CPU 102 and can also be connected to one another.

The memory 104 is present as a flash memory and has an address book among other things. Historical connection data and calendar events are also saved in the memory 104. The touchscreen 106 is an input/output unit for displaying processing results of the CPU 102 through a pixel graphic realized by LCD and/or LED and for recognizing user input through a touch-sensitive execution.

The mobile communication unit 108, which is designed and configured for communication with other communication partners via GSM and/or UMTS and/or LTE and/or other mobile radio standards, establishes mobile network connections and provides information on networks used and their quality. The clock 110 provides information on the current time and current date. The camera 112 provides information on brightness in the room. The WLAN unit 114, which is designed and configured for wireless communication with WLAN networks, also provides information on nearby networks, their signal strengths and, if applicable, connected networks. The GPS unit 116 also provides GPS localization information on the location of the communication device 100. The motion sensor 118, which is designed as an inertial sensor, also provides information on the motion status of the communication device 100. The motion status of the communication device 100 can be expressed numerically, for example as acceleration within the space, and also categorized, for example as "Walking," "Running," "Driving/Riding," "At rest." The Bluetooth unit 120, which is designed and configured to establish a Bluetooth connection with other nearby Bluetooth devices, also provides information on other nearby Bluetooth devices, such as a hands-free unit for the car, a connected Bluetooth headset, or the like.

The CPU 102 can also be described as a central processor. During the execution of the method according to the invention, the CPU receives and processes the information from the memory 104, the mobile communication unit 108, the clock 110, the camera 112, the WLAN unit 114, the GPS unit 116, the motion sensor 118 and the Bluetooth unit 120 and, among other things, calculates probabilities taking into account various source values and processes the results for display. Finally, a contact/action list, sorted and/or filtered by probability, is displayed on the touchscreen 106.

Although the communication device 100 has been described above as a mobile device, in particular a smart phone, it is understood that the present invention can be used on any type of communication device that can be configured to execute the desired functions. Although the central processing unit (CPU) 102, memory 104, touchscreen 106, mobile communication unit 108, clock 110, camera 112, WLAN unit 114, GPS unit 116, motion sensor 118 and Bluetooth unit 120 are shown and described as separate function units, some of these units can be physically and/or logically combined.

Figure 2:
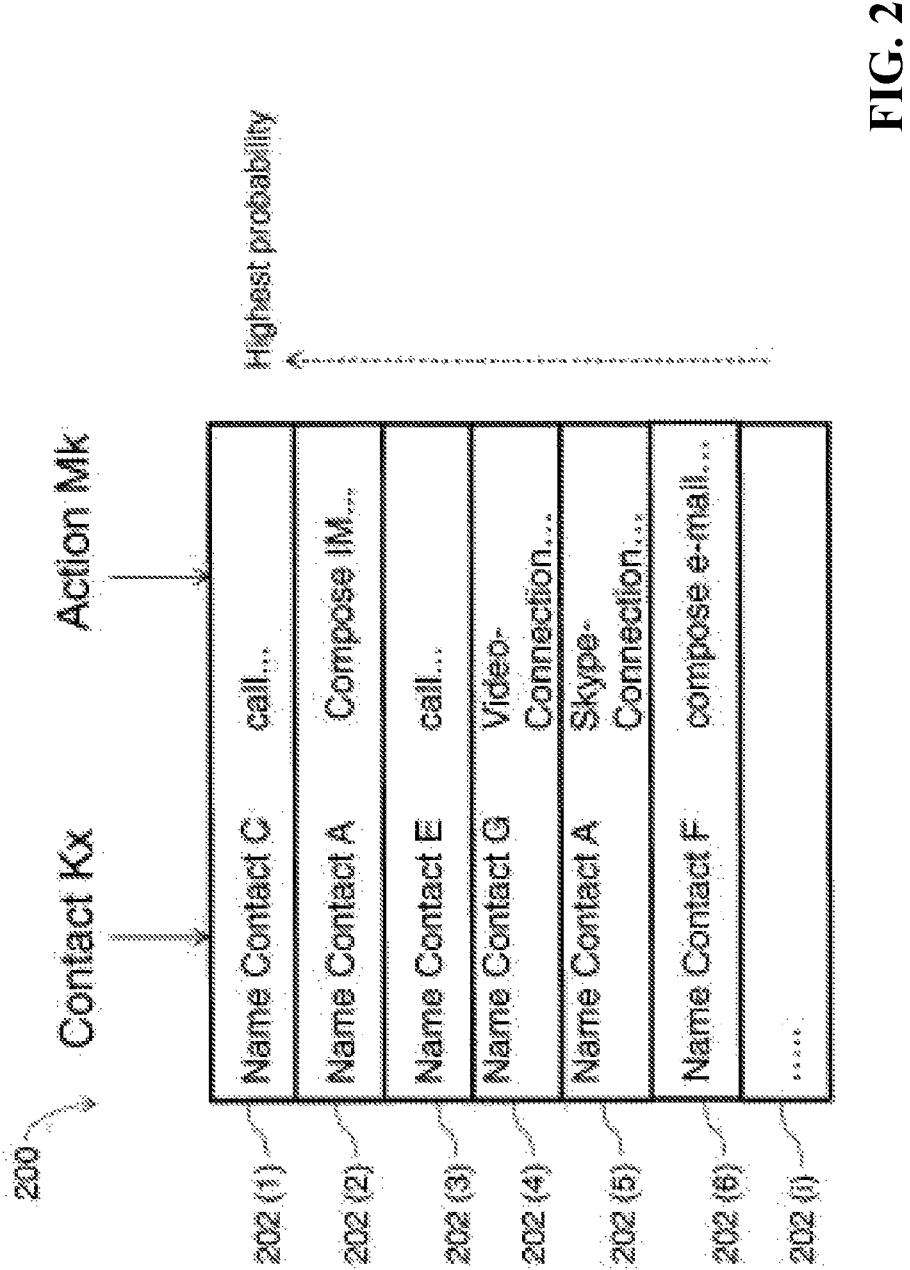
FIG. 2 a schematic diagram of a display list of contacts and media, sorted by probability according to the present invention.

FIG. 2 is a schematic diagram of a display list 200 of contacts and media sorted by probability according to the present invention. As shown in FIG. 2, the display list 200 has multiple list entries 202 (individually numbered as 202(1)-202(6), 202(i)). Each of the list entries 202 is a value pair of a contact name Kx with an associated media action Mk. The display list 200 is sorted so that that list entry 202 with the highest probability for the respective combination of contact name Kx and media action Mk appears in the first position, the list entry 202 with the second highest probability in the second position (202(2)) and so forth. Thus, the list entries 202 are derived from the log entries of a call log, in which each log entry has at least one connection identifier of the communication partner, date and time of the call, and direction of the call as communication metadata, as described in more detail below.

FIGS. 3A to 3D are each schematic diagrams of the communication device 100 with its touchscreen 106, on which a variant 200a-200d of the display list 200 from FIG. 2 corresponding to a situation is shown.

Figure 3A:
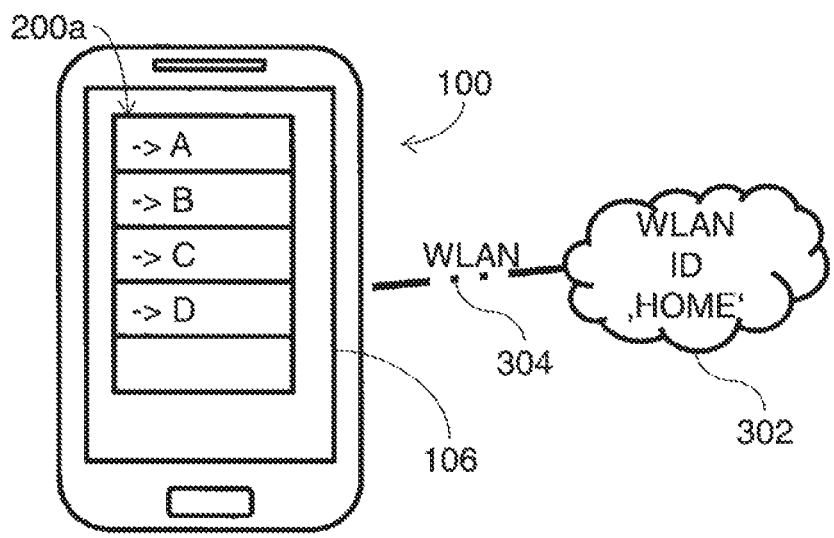
FIGS. 3A-3D schematic diagrams of a section of the display list from FIG. 2 in various situations.

According to the diagram in FIG. 3A, a user of the communication device 100 is at home. This situation is characterized in that the communication device 100 is in the vicinity of a WLAN 302 with the ID 'HOME' and has established a WLAN connection 304 to it, which is established through the WLAN unit (114 in FIG. 1) of the communication device 100. In this situation, the display list 200a has been generated by the CPU (102 in FIG. 1) of the communication device 100 and is displayed on the touchscreen 106, in which the contacts A, B, C, and D from the address book are sorted in the specified order. A value pair of contact name and media type can also be understood to be a contact, as described in more detail below.

Figure 3B:
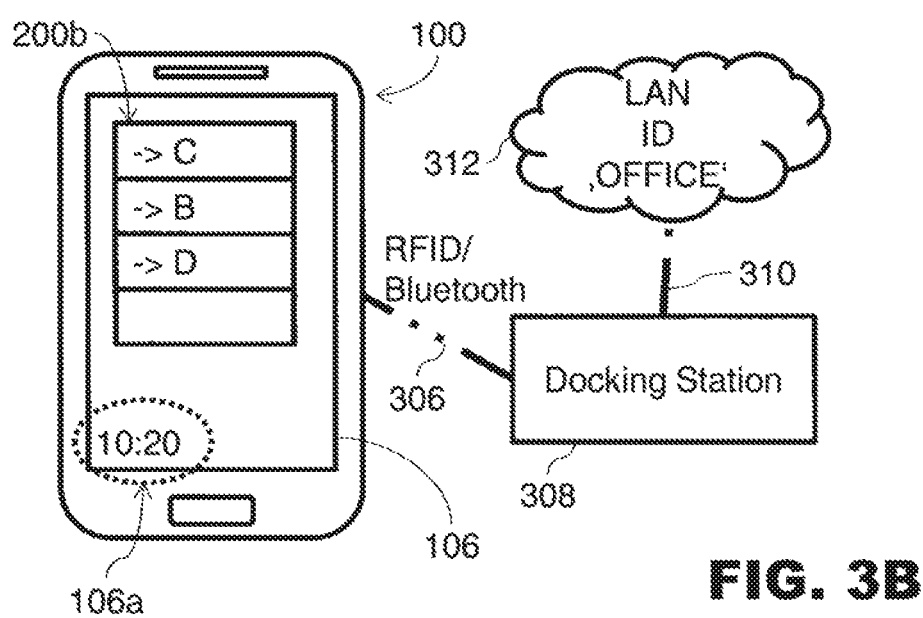

According to the diagram in FIG. 3B, a user of the communication device 100 is in the office. This situation is characterized in that the communication device 100 has established an RFID/Bluetooth connection 306 to a docking station 308, which is established through the Bluetooth unit (120 in FIG. 1) of the communication device 100. The docking station 308 is connected to a company network (LAN) 312 with the ID 'OFFICE' via a LAN connection 310. In the situation shown, the touchscreen 106 displays the time 10:20 indicated by the clock (110 in FIG. 1) in a time display area 106a. This is interpreted as the time of day "morning". In this situation, which can be described as "Office morning", the display list 200b has been generated by the CPU (102 in FIG. 1) of the communication device 100 and is displayed on the touchscreen 106, in which the contacts C, B and D from the address book are sorted in the specified order.

Figure 3C:
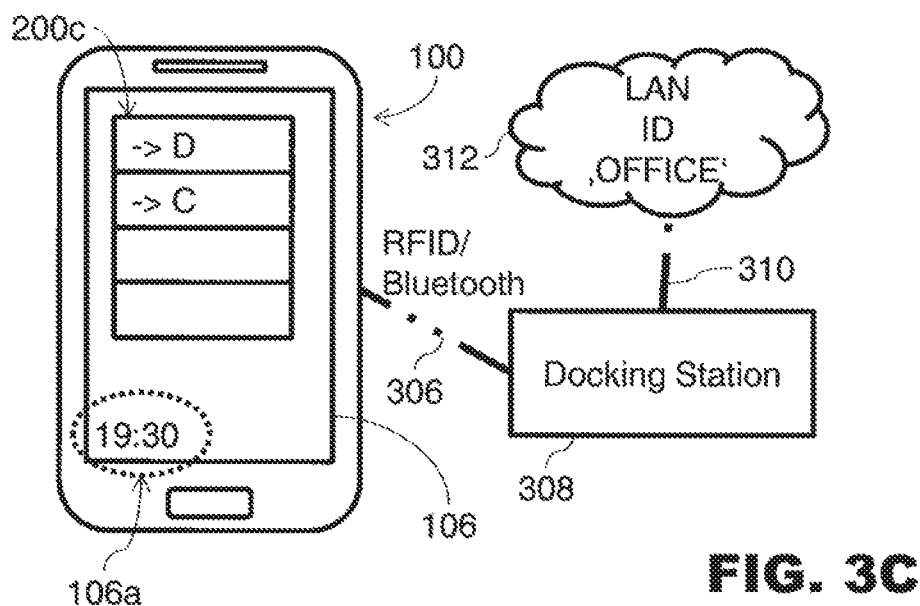

The situation shown in FIG. 3C differs from that shown in FIG. 3B only in that the touchscreen 106 displays the time 19:30 indicated by the clock (110 in FIG. 1) in the time display area 106a. This is interpreted as the time of day "evening". In this situation, which can be described as "Office evening", the display list 200c has been generated by the CPU (102 in FIG. 1) of the communication device 100 and is displayed on the touchscreen 106, in which the contacts D and C from the address book are sorted in the specified order. This display list 200c differs from the one shown at the same location "Office" in the morning because other phone numbers are dialed more frequently in the evening, for example, than in the morning.

Figure 3D:
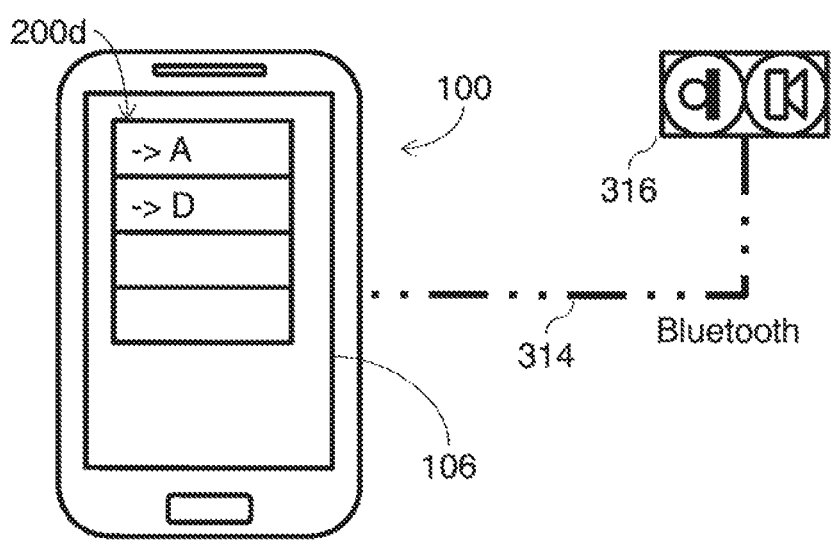

According to the diagram in FIG. 3D, a user of the communication device 100 is in his car. This situation is characterized by the fact that the communication device 100 has established a Bluetooth connection 314 to a hands-free device 316, which is established by the Bluetooth unit (120 in FIG. 1) of the communication device 100. In this situation, the display list 200d has been generated by the CPU (102 in FIG. 1) of the communication device 100 and is displayed on the touchscreen 106, in which the contacts A and D from the address book are sorted in the specified order. As in the previous example according to the diagram in FIG. 3C, only three contacts are displayed here, which could be due to the fact that the probability of other contacts fell below a threshold S.

Figure 4:
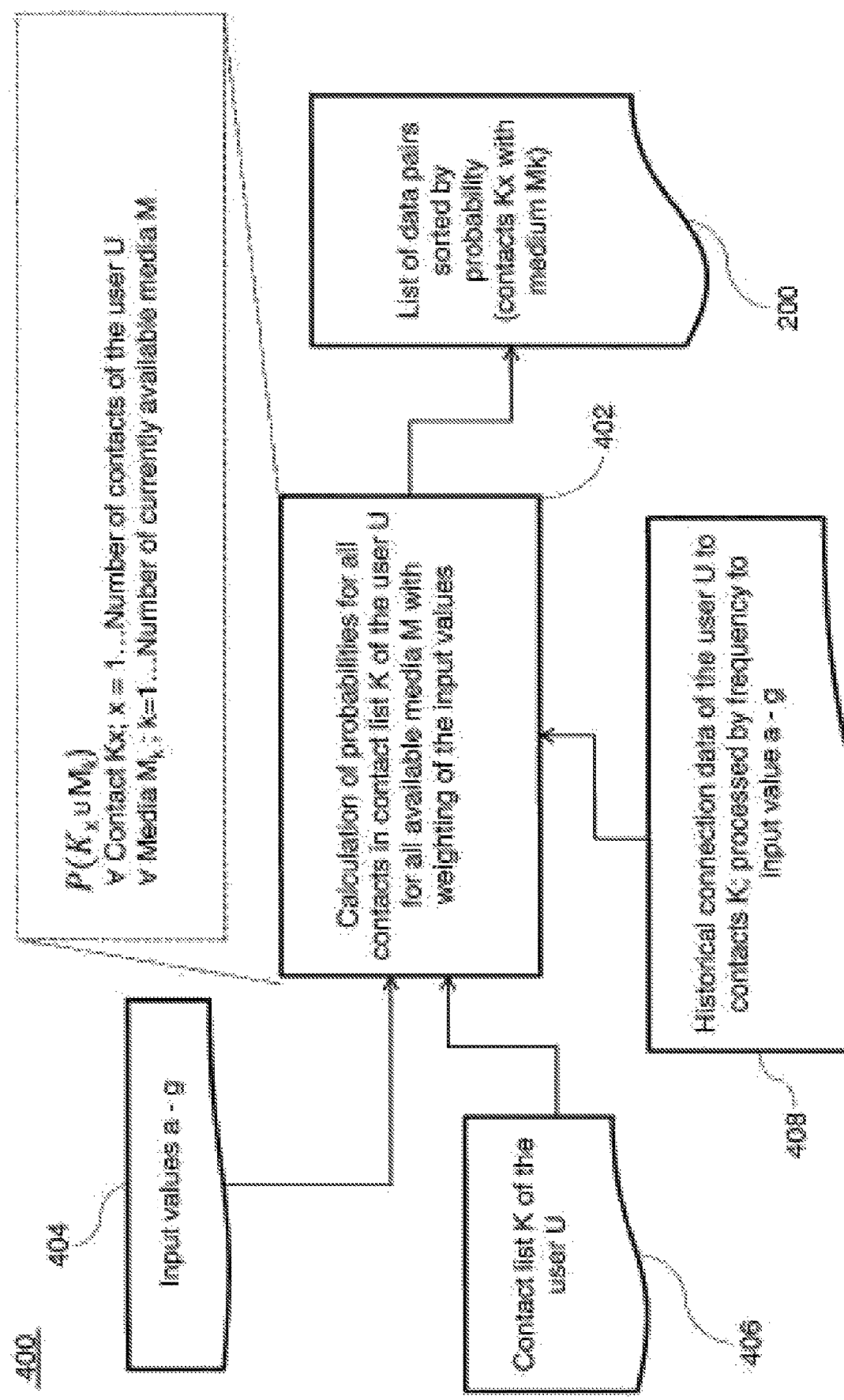
FIG. 4 a block diagram to illustrate a calculation process for determining the display list from FIG. 2.

FIG. 4 shows a block diagram to illustrate a calculation process for determining the display list in FIG. 2. Here the reference number 400 symbolizes a process for performing the calculation. A process can be understood as a method for the purposes of the present invention.

According to the diagram in FIG. 4, the process 400 has a central calculation step 402. The step 402 processes a number of input values a to g (symbolized by an input value file 404), a contact list K (also described as an address list for the purposes of the invention, wherein each entry corresponds to one contact) of the user U (symbolized by contact file 406), and historical connection data of the user U to contacts K, each processed according to frequency with input value a to g (symbolized by history file 408) and as the result provides the display list 200 of value pairs for a particular contact Kx (x=1 ... number of contacts of the user U) with media Mk (k=1 ... number of media currently available), sorted by probability. The calculation step 402 calculates probabilities for all contacts Kx in the contact list K of the user U for all available media Mk based on input values a to g, wherein the input values a to g can be weighted. The input values a to g correspond to the information provided by the mobile communication unit 108, clock 110, camera 112, WLAN unit 114, GPS unit 116, motion sensor 118 and Bluetooth unit 120. The input values a to g can also be understood as criteria for the purposes of the invention. The contact list K (contact file 406) and the historical connection data (history file 408) are provided by the memory 104 (FIG. 1). Alternatively or as a preliminary measure, the contact list K (contact file 406) and/or the historical connection data (history file 408) can also be provided or loaded by a server. The history file 408 can also be understood as a call log for the purposes of the invention.

A data set contains connection information from the history file 408, for example, the following communication data:

time (or categorization, e.g. morning, afternoon, evening)
 date (or weekday categorization)
 phone number/contact (phone number/contact dialed)
 location (coordinates of the location at which the connection was established)
 Environment information (e.g. Bluetooth IDs of paired devices, WLAN IDs, RFIDs, motion sensor, light sensor, etc.)

The additional location information and environment information are stored in addition to the traditional data.

The calculation of probability in step 402 is carried out as follows:

$$P(\{\text{Select contact } X\}) = f(X, \text{current time}, \text{current location}, \text{current environment information}, \text{historical connection data})$$

The calculation of the probabilities P and the resulting sorting of connections/contacts of the call log take place locally on the mobile telephone. In one modification, the calculation of the probabilities P can also take place centrally on a server when a central call log is used by multiple devices.

In addition to being sorted, the call log display can also be filtered, i.e. entries with probabilities below a threshold S will not be displayed.

Due to the use of mobile devices (cell phones/tablets), a telephone is no longer tied to a location. This makes it possible to offer the user additional convenience functions. The solution presented here offers the user a location- and/or time-dependent filtering or sorting function for the call log. If this new function is activated, the entries in the call log are sorted or filtered by location or time while taking into account the historical entries, i.e. a probability calculated based on the historical entries. An influencing factor for calculating probability can be, for example, the current distance to earlier starting points of the communication. Call data from the past, the starting point of which is close to the current location, are prioritized in that order in the list and displayed higher. Another influencing factor can be the consideration of time, such that phone numbers that were called primarily in the evening, morning or on other weekdays, for example, are displayed further down in the list. A weighted combination of distance and call time, as well as connection frequency, is also possible. Known stochastic methods can be used here to derive probabilities for individual entries and to sort or filter the list of calls accordingly.

For example, a mobile telephone of a user A in a conference room is connected (paired) with a docking station there via Bluetooth. From the historical connection data, it can be derived that in this state (mobile telephone connected to docking station with a unique identification number (UID) xyz), a number of phone numbers or contacts have been dialed with high probability. Then the current time or current day of the week can also be considered. Entries are sorted by the calculated probabilities. The same applies for the office or home office or also in the car, etc.

The location can be determined in different ways or be derived from environment information. The devices generally have one or more techniques for this at their disposal:
  GPS (can only be used outside of buildings),
  WLAN (accuracy only sufficient through "cross-bearing" by multiple WLAN APs/controllers, but simply the visibility may be enough, i.e., the name of one or a combination of different access points is enough, since the WLAN router at home usually has a different name than the access point(s) at the workplace),
  Bluetooth—proximity or pairing to other stationary Bluetooth devices—e.g., docking station at the workplace or hands-free device in the car,
  RFID (has only a very short range)

In addition to the connection information (dialed phone number/contact, time, date), even more data on the location can be stored (either locally or centrally, i.e. the data is transferred into the Cloud, for example). Location data are, for example: GPS coordinates, name/SSID of the most powerful visible WLAN router, Bluetooth ID of paired devices, such as a docking station at the workplace or in the conference room.

The location-based and time-filtered display of call log entries offers the user additional convenience and reduces the time needed to operate the device.

A prerequisite for the location-dependent display/filtering of call log entries is the ability to determine the current location of the mobile device or ascertain environment information (e.g. WLAN IDs)—this is provided with modern smart phones.

Bluetooth 4.0 (also known as "Low Energy" or "SMART") supports a special "Proximity" profile that makes it possible to determine the distance between two Bluetooth 4.0 devices. If, for example, a Bluetooth hands-free system is available in a conference room, with this information it can be determined whether the mobile device is in that conference room or not. This information can then be used in turn by an appropriately programmed application (App) on the mobile device to calculate probabilities and to sort the call log entries accordingly.

The present invention offers a user who wants to communicate with another participant in a certain "location/situation" an intelligent (meaningful) selection of communication partners or communication connections, without limiting him to a local "sorting" of call log entries. Based on statistical calculations taking into account multiple input values (among other things, the connection history), the system can propose the most probable communication partners/channels/connections for the current location or the current situation.

The intelligent selection of communication partners is not solely based on location information. Location information is merely an additional piece of information allowing an intelligent initial selection (by statistical analysis) of communication partners to be made. Instead, additional parameters/information sources are or can be drawn upon:
  current date (i.e., day of week, month),
  time (if applicable, classified as morning, noon, afternoon, evening, etc.)
  upcoming calendar events (e.g., meetings entered in the calendar),
  frequency of contact with a certain communication partner,
  environment (e.g., car, home, work, etc. derived from environment information, such as "connected via Bluetooth to the hands-free system in the car," "proximity to certain WLAN networks," etc.)
  weather information, such as temperature, precipitation (e.g., for recreational activities),
  an overall picture (referred to as "situation" or "situation information" below), which can be used to calculate the probability with which a certain communication partner in a certain "situation" is likely to be contacted.

For example, the probability of calling the meeting organizer is greater in the time frame between 15 minutes before to 15 minutes after the start of a meeting. Therefore, a higher probability is calculated at this time for certain phone numbers/contacts or the telephone number of the conference room. If the system has access to the calendar, information from the current or upcoming calendar event can be taken into account in the calculation (also, if applicable, room No. and mapping of the room number to a certain telephone number through directory access or an address book). The same considerations can be made for other calendar events.

The present invention is also not limited to a certain medium, such as VoIP telephony. It can also be used with other forms of communication to give the user intelligent proposals for contact with certain communication partners, the probability of which has been calculated from historical information. For example, in a conference room, a user usually writes an e-mail or text message to private contacts (e.g., his family members) but makes no voice calls. Logically, the system offers primarily textual communication media for these contacts based on "situation information".

It could also be that certain contacts are always called at certain times in certain places (i.e., situations) via video call (e.g., Facetime)—so their probability would be calculated higher and accordingly proposed in the display for the establishment of a connection—regardless of the current situation.

In addition to the intelligent selection of communication partners for various media, the intelligent selection of the medium itself is also possible. For example, based on "situation information," the system establishes that a user always makes GSM calls within a certain geographic region. This could be due to the fact that there is no reliable data connection in this region and therefore no VoIP calls are possible. Based on this information, the appropriate medium can be proposed to the user when making an outgoing call.

It is obvious that, based on the information disclosed in the present application, a person skilled in the art can see many possible applications that are not expressly mentioned here but are fully covered by the scope of protection of the present application.

With respect to the features of the invention described in the embodiments shown, such as the WLAN connection 304 in FIG. 3A, for example, they can exist in other embodiments of the invention, for example in addition or as an alternative to the RFID/Bluetooth connection 306 in FIG. 3B, except when stated otherwise or when impossible for technical reasons.

The invention claimed is:

1. A communication device, comprising:
a processor, non-transitory computer readable medium communicatively connectable to the processor, the non-transitory computer readable medium having a call log stored therein, the call log having entries on at least one of outgoing calls and incoming calls, each log entry having communication metadata, the metadata comprising at least one of a connection identifier of a communication partner, a date and a time of a call with the communication partner, and direction of the call with the communication partner;
the communication device configured to determine probabilities for who a user of the communication device desires to communicate with for communication partners identified in the call log at a current time based on historical entries of the call log and order display list entries of a display list based on an evaluation of criteria comprising at least one of: current communication device parameters, current connection parameters, and calendar events and also based on the determined probabilities of who the user of the communication device desires to communicate with at the current time based on the historical entries of the call log;
the communication device configured to generate a display list with display list entries that are derived from the log entries of the call log so that the display list lists the display list entries in the determined order of the display list entries for the display list; and
the communication device configured to display the generated display list via a display device communicatively connected to the communication device.

2. The communication device of claim 1, wherein the communication device is a mobile communication device.

3. The communication device of claim 1, wherein the current connection parameters include at least one of: availability of instant messaging, availability of telephone calls, availability of video calls, and availability of emails.

4. The communication device of claim 1, wherein the current connection parameters include at least one of: bandwidth, signal strength, and quality of a GSM signal.

5. The communication device of claim 1, said metadata further comprising location information of the communication device at the time of a call.

6. The communication device of claim 1, wherein the determined order of the display list entries is also based on current location information of the communication device at a time that the display list is generated.

7. The communication device of claim 6, wherein the location information is selected from the group consisting of coordinates of a satellite navigation system, WLAN access to one or more dial-in nodes, proximity or pairing status to one or more other Bluetooth devices, RFID information, environment categories, and current weather data.

8. The communication device of claim 1, wherein the evaluation of the criteria includes a probability calculation that determines for each connection identifier, based on previous log entries in the call log, a probability that a call with that connection identifier which meets at least one criterion will go out from or come into the communication device.

9. The communication device of claim 1, wherein the communication device is configured to combine multiple log entries from the call log into one list entry in the display list.

10. The communication device of claim 1, wherein the communication device is configured to minimize the display list to a preset maximum number of list entries.

11. The communication device of claim 1, wherein the determination of the order of the list entries is influenced by at least one measure selected from the group consisting of selection of groups of connection identifiers, preference toward groups of connection identifiers, exclusion of groups of connection identifiers, restriction to incoming or outgoing calls, establishment of a minimum probability, and establishment of a maximum number of list entries.

12. The communication device of claim 1, wherein the communication device is a central call management server.

13. A non-transitory computer readable medium having a computer program for managing a call log of a communication device stored thereon, the program comprising program commands that prompt the communication device to execute a method, the method comprising:
the communication device determining probabilities for who a user of the communication device desires to communicate with for communication partners identified in the call log at a current time based on historical entries of the call log, the call log having log entries on at least one of outgoing calls and incoming calls, each log entry having communication metadata, the metadata comprising at least one of a connection identifier of a communication partner, a date and a time of a call with the communication partner, and direction of the call with the communication partner;
determining an order of display list entries of a display list, based on an evaluation of criteria comprising at least one of: current device parameters, current connection parameters, and calendar events and also based on the determined probabilities of who the user of the communication device desires to communicate with at the current time based on the historical entries of the call log;
generating a display list with display list entries that are derived from the log entries of the call log so that the display list lists the display list entries in the determined order of the display list entries for the display list so that the generated display list is providable to a user of the communication device.

14. The non-transitory computer readable medium of claim 13, wherein the metadata includes the connection identifier of the communication partner and the date and a time of the call with the communication partner.

15. The non-transitory computer readable medium of claim 13, wherein the metadata includes the date and a time of the call with the communication partner and the direction of the call with the communication partner.

16. The non-transitory computer readable medium of claim 13, wherein the criteria includes the current device parameters and the current connection parameters.

17. The non-transitory computer readable medium of claim 13, wherein the criteria includes the current connection parameters and the calendar events.

18. The non-transitory computer readable medium of claim 13, wherein the method also comprises:
filtering the determined order of display list entries based on the determined probabilities for who the user of the communication device desires to communicate with for communication partners identified in the call log at the current time based on historical entries of the call log so that only communication partners having a determined probability at or over a threshold value are identified in the display list provided to the user of the communication device.

19. The non-transitory computer readable medium of claim 13, wherein the determining of the probabilities for who the user of the communication device desires to communicate with for communication partners identified in the call log at the current time based on historical entries of the call log comprises:
deriving probabilities for each of the communication partners identified in the call log from the historical entries of the call log based on a weighted combination of call time and connection frequency.

20. The non-transitory computer readable medium of claim 13, wherein the metadata includes the date and a time of the call with the communication partner and the criteria includes the current connection parameters.

* * * * *